April 26, 1938.  B. W. BENBOW  2,115,135
TRAVELING ELECTRICAL CONTACTOR
Filed July 8, 1935
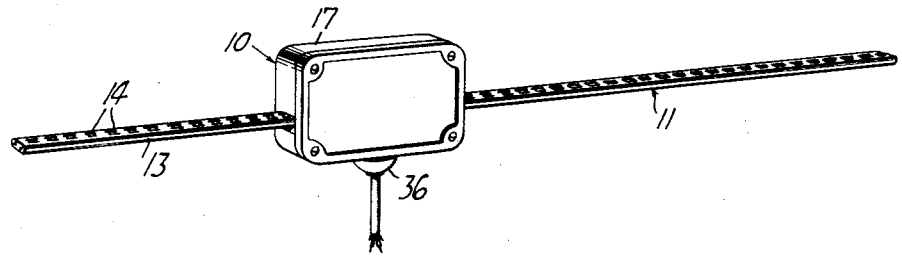
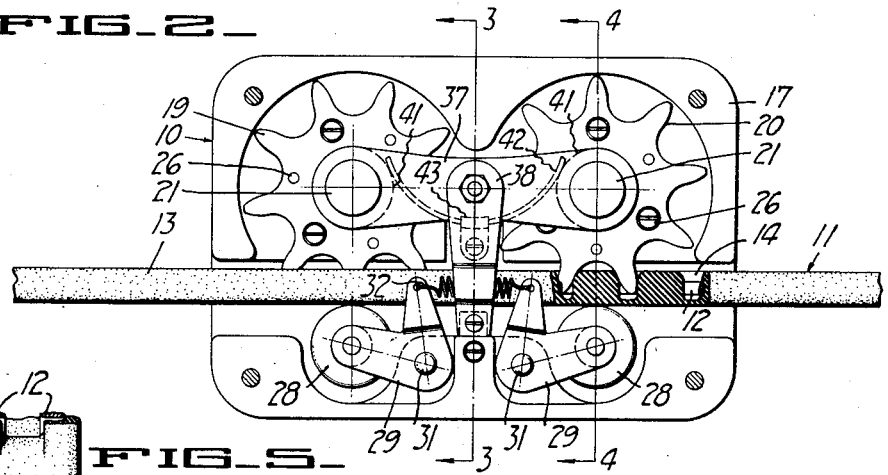
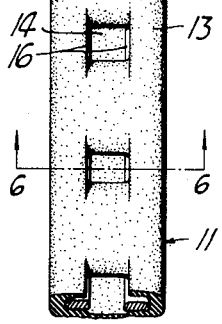
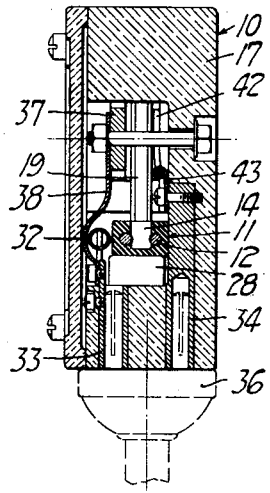
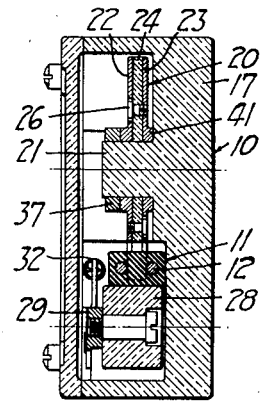
INVENTOR.
Burtis W. Benbow
BY Paul D. Flehr
ATTORNEY.

Patented Apr. 26, 1938

2,115,135

UNITED STATES PATENT OFFICE 2,115,135

TRAVELING ELECTRICAL CONTACTOR

Burtis W. Benbow, Benbow, Calif.

Application July 8, 1935, Serial No. 30,307

8 Claims. (Cl. 191—12)

This invention relates generally to apparatus by means of which an electrical outlet or like device can be shifted to various positions with respect to a source of current supply, without the necessity of utilizing long flexible cords. More specifically, it relates to apparatus utilizing an outlet box or like device which is adapted to travel with respect to a pair of relatively fixed electrical conductors, to which the current supply is connected.

It is an object of the present invention to provide a device of the above character, in which the outlet box or like traveling device does not require the use of exposed electrical conductors.

A further object of the invention is to provide a device of the above character which will at all times make positive contact with the source of current supply, even when the outlet box or like device is being moved with respect to the co-operating conductors.

A further object of the invention is to provide a novel form of insulated electrical cable which is particularly adapted for co-operation with a traveling outlet box or like movable contacting device.

Further objects of the invention will appear from the following description, in which the preferred embodiment of the invention has been set forth in detail in conjunction with the accompanying drawing.

Fig. 1 is a perspective view, illustrating apparatus incorporating the present invention.

Fig. 2 is a side elevational view of the apparatus, with the cover removed from the outlet box to expose the working parts.

Fig. 3 is a cross-sectional detail taken along the line 3—3 of Fig. 2.

Fig. 4 is a cross-sectional detail taken along the line 4—4 of Fig. 2.

Fig. 5 is a plan view on an enlarged scale, showing the novel form of electrical cable which I prefer to employ.

Fig. 6 is a cross-sectional detail taken along the line 6—6 of Fig. 5.

Referring first to Figs. 1, 5 and 6, I have shown a traveling outlet box 10 in conjunction with an electrical cable 11. This electrical cable is of a unique construction, as illustrated in detail in Figs. 5 and 6. Thus, it consists of a pair of spaced parallel conductors, such as common copper wires 12, which are provided with a sheath 13 of insulating material, such as resilient rubber which may be reinforced by fabric. One side of the sheath 13 is interrupted by a plurality of regularly spaced recesses or apertures 14, which serve to expose spaced opposed portions 16 of the conductors 12. While the openings 14 may extend entirely through the insulating sheath, it is preferable to leave one side of the sheath uninterrupted, as illustrated in Fig. 6.

The device 10, as illustrated in detail in Figs. 2, 3 and 4, consists of a body 17 which can be conveniently formed of suitable insulating material, such as a molded phenolic condensate product. Positioned within the body 17 are the toothed rotatable wheels 19 and 20. These wheels may be of duplicate construction, and they are shown carried by suitable journal studs 21. As shown more clearly in Fig. 4, each wheel is formed of two metal parts 22 and 23, separated by suitable insulating material 24. Studs 26 may extend through the insulating material for the purpose of retaining the two parts 22 and 23 together, without, however, directly electrically connecting them together. The spacing between the teeth of the two wheels 19 and 20 is such that these teeth engage in the openings 14 of the electrical cable, like a sprocket engaging the teeth of a chain. In order to insure a proper degree of pressure against the cable, the cable is resiliently urged towards the toothed wheels by rollers 28. Each of these rollers is shown journaled to one arm of an L-lever 29, which in turn has a pivotal mounting 31 to the body 17. The other arms of the two L-levers 29 are urged together by the tension spring 32.

Assuming that the device 10 is an outlet box, into which a flexible electrical cord may be plugged, the lower side of the box is provided with terminals 33 and 34, adapted to engage the bayonet connectors of an electrical plug 36. The corresponding parts 22 of the wheels 19 and 20 are electrically connected together by the metal bar 37. The ends of this bar are apertured to accommodate the studs 21, and are pressed into good electrical contact with the wheel parts 22, by leaf spring 38. This spring is in turn electrically connected with the terminal 33. The hubs 41 formed on the wheel parts 23, are engaged by the end portions of a tensioned wire bow 42. This bow is held by a metal clip 43, which in turn is electrically connected with the terminal 34. It is of course understood that other suitable means can be provided for making electrical connections to the parts 22 and 23 of the tooth wheels, the arrangement described being merely by way of example.

The aparatus described above is employed as follows: The cable 11 is stretched between two points, between which it is desired to operate the device 10. At one end of the cable the conductors are of course connected to a source of current supply. An appliance, such as an electric light or portable motor, is now connected to the outlet, as by means of plug 36 and a flexible electrical cord. The teeth of the wheels 19 and 20, being urged into the openings 14 of the cable, make electrical contact with the exposed cable portion 16, and thus current is supplied through the insulated wheel parts 22 and 23, to the device being operated. It will be noted in Fig. 2 that when the tooth of wheel 19 is in fully engaged position, one tooth of wheel 20, is entering an opening 14, and an adjacent tooth is leaving an opening. With such an arrangement, good electrical contact between at least one tooth of the two wheels, and the conductors 12, is assured. The outlet 10 can be freely moved between the points to which the ends of the cable 11 are attached, to accommodate different positioning of the appliance being operated. Irrespective of the positioning or the speed of movement of the outlet box, uninterrupted electrical connection with the source of current supply is secured.

Due to the novel type of cable 11 employed, the conductors of this cable are relatively close together, and the insulation provided minimizes fire hazard and the possibility of shock. This is because of the use of a row of spaced openings through which contact is made to the conductors. Note that the openings 14 are so proportioned that they will accommodate a tooth 19, without being so large as to permit accidental contact with wires 16, or to minimize the support afforded for the wires. As illustrated the length and width of each opening is less than the total width of the cable.

It is evident that various modifications can be made within the scope of my invention. For example, the box 10 and cable 11 as shown in Fig. 1 can be inverted, with a shift in the position of the terminals 33 and 34, thereby facing the recesses 14 downwardly for protection against moisture. Likewise the form of body 10 may vary, and in place of a passage through the body to pass the cable, the body may afford an open slot so that intermediate portions of the cable can be supported by brackets.

I claim:

1. In apparatus of the character described, a body formed to afford a guide-way for a multiple conductor cable, a toothed wheel rotatably carried by the body, the teeth of said wheel being formed of separate metal parts spaced by electrical insulation, and means for urging the teeth of said wheel into electrical contact with the conductors of the cable.

2. In apparatus of the character described, an electrical cable comprising parallel conductors covered by an insulating sheath, said insulating sheath being interrupted by a row of spaced openings whereby the conductors can be contacted through said openings, a body adapted to travel along said cable, and means carried by the body adapted to maintain continuous electrical connection with the conductors of said cable through said openings, as the body is traversed along the cable.

3. In electrical apparatus of the character described, an electrical cable consisting of a pair of parallel conductors having a common insulating sheath, said insulating sheath having openings spaced longitudinally of the cable, through which the conductors of the cable can be electrically contacted, a body adapted to travel longitudinally of the cable, and a toothed means rotatably carried by the body and adapted to make separate electrical contact with the conductors of the cable.

4. In apparatus of the character described, an electrical cable consisting of a pair of parallel conductors having a single sheath of insulating material, said sheath being formed with openings spaced longitudinally of the cable to which the conductors can be contacted, a body adapted to travel longitudinally of the cable, a toothed wheel rotatably carried by the body, said apertures being adapted to be entered by the teeth of said wheel, the teeth of said wheel being formed of separate metallic parts separated by insulation, whereby the two parts of each tooth serve to make separate electrical contact with the conductors of said cable.

5. In electrical apparatus of the character described, a cable comprising a pair of parallel conductors having a common sheath of insulating material, said sheaths being interrupted by spaced openings through which the conductors of the cable can be contacted, a body adapted to travel longitudinally of the cable, a toothed wheel rotatably carried by the body, the teeth of said wheel being adapted to register and enter said openings as the device is moved longitudinally of the cable, each of the teeth of said wheel being formed of two metallic parts separated by insulation whereby the two parts of each tooth serve to make electrical contact with the separate conductors of the cable, and means serving to resiliently urge the cable into engagement with the teeth of said wheel.

6. In electrical apparatus of the character described, an electrical cable comprising a pair of parallel conductors having a common sheath of insulating material, said sheath being formed to provide regularly spaced openings through which the conductors of the cable can be contacted, a body adapted to travel longitudinally of the cable, a pair of toothed wheels rotatably carried by the body, and means for urging the cable into engagement with said toothed wheels whereby the teeth of said wheels enter said openings and make electrical contact with said conductors, the teeth of each wheel being formed of separate metallic parts separated by insulation, whereby said two parts of the teeth of each wheel make separate electrical contact with the two conductors of the cable.

7. In electrical apparatus of the character described, an electrical cable comprising a pair of parallel conductor wires of uniform diameter, a common sheath of insulating material surrounding said wires, the part of said sheath located between the wires being interrupted by a row of spaced apertures through which only the inner sides of the wires are exposed for electrical contact.

8. In electrical apparatus of the character described, an electrical cable comprising a pair of parallel electrical conductors, a sheath of insulating material surrounding said conductors, one side of said sheath being interrupted by a row of spaced apertures through which only the inner sides of the conductors are exposed for electrical contact, the other side of said sheath being substantially uninterrupted, said apertures being located in that part of the sheath extending between the conductors.

BURTIS W. BENBOW.